Jan. 21, 1964 H. ALLEN ETAL 3,118,649
BALL VALVE WITH A REINFORCED AND DEFORMABLE VALVE SEAT
Filed June 15, 1961 2 Sheets-Sheet 2
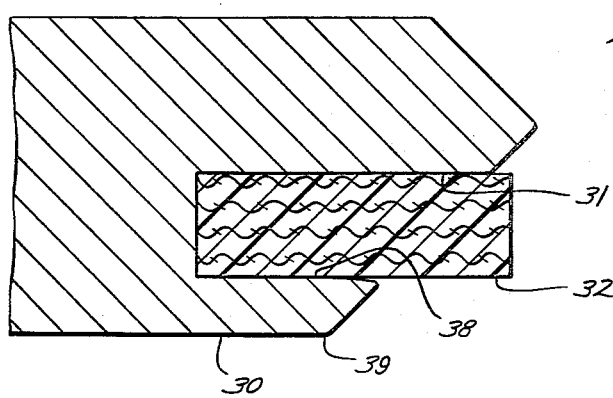
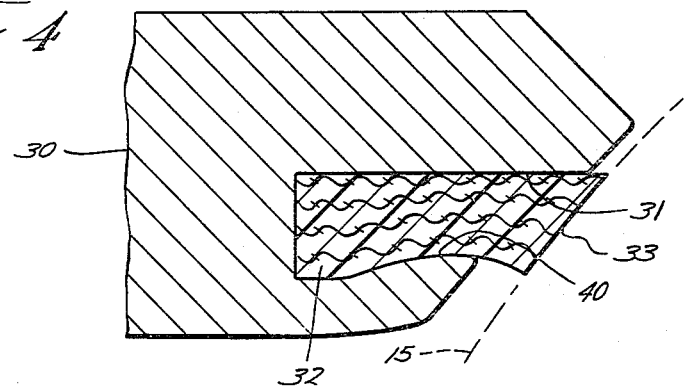
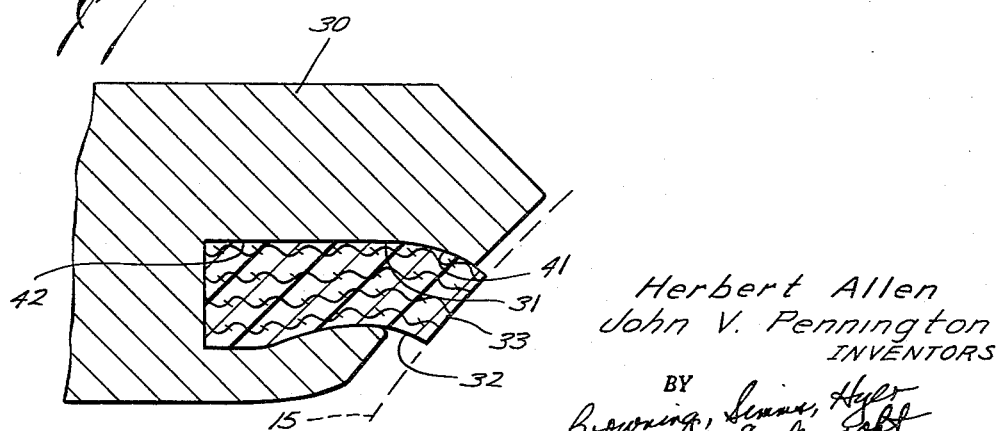
Herbert Allen
John V. Pennington
INVENTORS
BY
Browning, Simms, Hyer
& Eichenroht
ATTORNEYS United States Patent Office
3,118,649
Patented Jan. 21, 1964

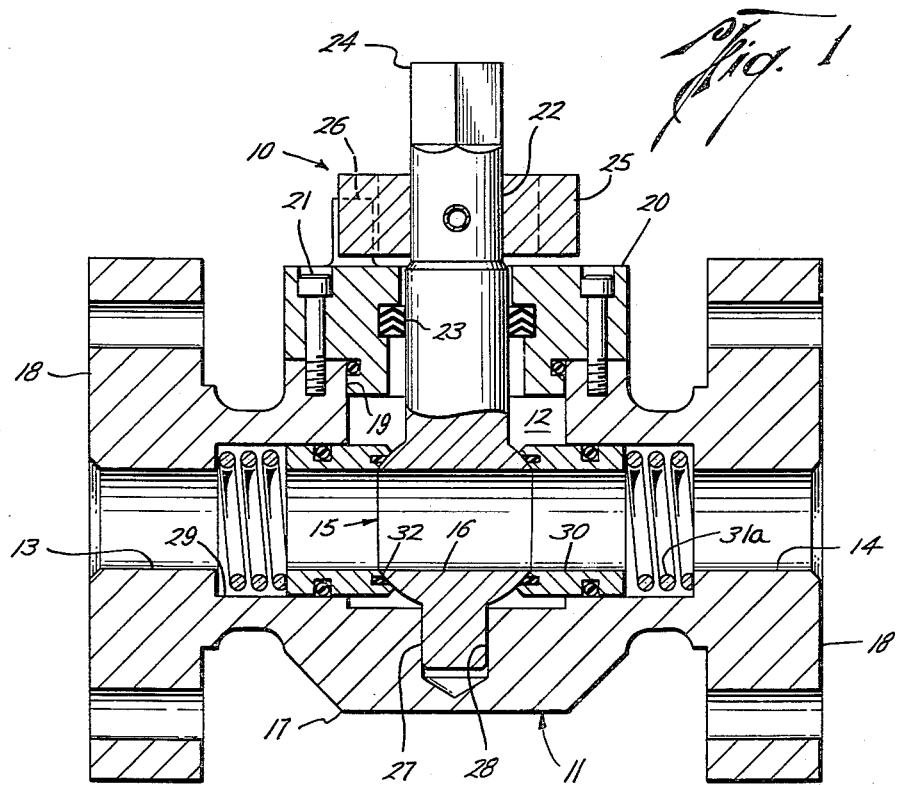
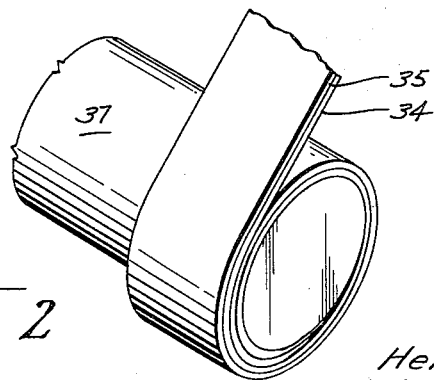
Herbert Allen
John V. Pennington
INVENTORS

3,118,649
BALL VALVE WITH A REINFORCED AND
DEFORMABLE VALVE SEAT
Herbert Allen and John V. Pennington, Houston, Tex.,
assignors to Cameron Iron Works, Inc., Houston, Tex.,
a corporation of Texas
Filed June 15, 1961, Ser. No. 117,365
9 Claims. (Cl. 251—309)

This invention relates generally to valves, and more particularly to improvements in valves having plastic seating surfaces. In other aspects, it relates to improvements in plastic rings suitable for use as such seats and replaceable valve seats for carrying such rings.

Many plastics, and especially polytetrafluoroethylene (which is known by the trademark "Teflon" and is supplied by the E. I. duPont deNemours & Co., Inc.), have become recognized as good materials for valve seating surfaces because they are smooth and relatively hard and further because they are readily moldable into a desired shape. Polytetrafluoroethylene has the additional advantages of having a slippery surface and of being inert insofar as many fluids are concerned. Rings of such material are ordinarily carried either in the valve body proper or by replaceable valve seats so as to protrude outwardly therefrom for engaging the valve member as it moves thereacross.

One difficulty which has been found in the use of polytetrafluoroethylene as a valve seat ring is its tendency under pressure to shear along a plane extending across its thickness at about 45° to its axis. Also, of course, seat rings of this particular plastic as well as others do not wear as well as metal seating surfaces. Furthermore, even though these plastics are relatively hard, their outwardly protruding ends may mushroom or collapse under the high axial thrusts encountered in many valves. Still another problem is the difficulty of securing the plastic rings within the valve body or in a valve seat within such body. As a result, many of these rings have been blown out by line fluid which finds its way into the recess for the seat.

An object of this invention is to provide a valve having seat rings made of a plastic material, and particularly of polytetrafluoroethylene, which are less susceptible to many and preferably all of these shortcomings.

Another object is to provide such rings which have greater resistance to shear, longer wear characteristics, and less tendency to mushroom than prior rings of this type.

A further object is to provide a plastic seat ring which is reinforced in such a manner as to accomplish the foregoing objects without, at the same time, appreciably increasing the over-all coefficient of friction of the seating surface thereof.

Still another object is to provide a plastic seat ring which is secured by crimping within a recess in either the valve body proper or a replaceable valve seat without, at the same time, setting up undesirable stresses in the ring.

Yet another object is to provide a reinforced plastic seat ring in which plastic and reinforcing materials possessing considerably different expansion and contraction characteristics are nevertheless assembled into a strong and durable product.

A still further object is to provide reinforced plastic rings for accomplishing any one of the foregoing objects which may be manufactured with a minimum of time and expense.

These and other objects are accomplished, in accordance with the illustrated embodiment of the invention, by a plastic valve seat ring having reinforcing material molded therein in radially spaced-apart layers for disposal, with the seat carried in a valve body for seating engagement with the valve member, across the aforementioned plane of shear of the seat. That is, the layers of reinforcing material will extend parallel to the axis of the ring so as to be at least approximately angularly intermediate either of two such planes disposed at 45° to the axis of the seat. Thus, in addition to increasing the wear characteristics of the seat ring, these layers of reinforcing material provide optimum resistance to shear.

This disposal of the outer ends of the reinforcing layers at least substantially perpendicularly to the seating surface of the ring also provides maximum resistance to mushrooming or collapsing of the protruding portion of the seat ring. Still further, it presents a minimum area of friction producing material for engagement with the valve member so that the ring has a coefficient of friction only slightly greater than that which it would possess in the absence of any reinforcement.

Each seat ring is secured within an annular recess formed either in a removable seat or the valve body proper by means of a flange formed by one wall of the recess and crimped against the seat. More particularly, and in accordance with another novel aspect of the invention, this wall is curved convexly with respect to the ring to distribute stresses in the seat adjacent the crimped area. In the case of the ball valve illustrating this invention, the inner wall of the recess forms the flange which is so crimped to secure the seat, and the outer wall of the recess is curved concavely with respect to the ring to force the ends of the reinforcing layers into a more nearly perpendicular position with respect to the seating surface of the ring.

Because of the favorable characteristics previously noted, the seat ring of this invention is preferably formed of polytetrafluoroethylene. The reinforcement is at least partly fiberglass cloth not only because of its strength for this purpose, but also because it can be made to adhere very well to polytetrafluoroethylene as it is molded thereto. Although the reinforced ring may be manufactured in a number of different ways, it is preferred that alternate sheets of polytetrafluoroethylene and woven cloth containing fiberglass be wound spirally about a mandrel and then molded to one another under heat and pressure. Adhesion of the fiberglass and polytetrafluoroethylene is further enhanced by initially coating the fiberglass with polytetrafluoroethylene.

Although polytetrafluoroethylene and fiberglass can be made to adhere quite well, they have radically different coefficients of thermal expansion. Thus, in rings molded with cloth made entirely of fiberglass, it was found that, when the mandrel is removed from the ring and the ring allowed to cool, the fiberglass tended to wrinkle unevenly about the circumference of the ring, resulting in areas of weakness and failure. This problem is overcome, in accordance with one modification of this invention, by the use of cloth containing interwoven strands of polytetrafluoroethylene and fiberglass and arranged, in the wrap-up of the cloth with the plastic sheet material, to dispose the polytetrafluoroethylene strands in surrounding relation to the axis of the seat and the fiberglass strands parallel to such axis. Thus, the reinforcement and intermediate plastic sheet material will and contact equally in a circumferential sense and there will be little or no tendency for the ring to wrinkle during cooling.

In the drawings, wherein like reference characters are used throughout to designate like parts:

FIG. 1 is a longitudinal sectional view of a ball valve having replaceable seats carrying rings constructed in accordance with the present invention;

FIG. 2 is a perspective view illustrating the preferred method of manufacturing the ring;

FIG. 3 is an enlarged sectional view of part of one of the seats of FIG. 1 and with the seat ring received therein during an initial stage of its assembly;

FIG. 4 is a view similar to FIG. 3, but showing the ring secured within the recess of the seat and with its seating surface finished for seating engagement with the valve member surface indicated in broken lines; and FIG. 5 is a view similar to FIG. 4, but showing a modified form of seat and ring wherein the ends of the reinforcing layers of such ring are disposed more nearly perpendicular to the seating surface thereof.

With particular reference to the above-described drawings, the valve 10 of FIG. 1 comprises a valve body 11 having a flowway therethrough formed by a chamber 12 intermediate an inlet 13 thereto and outlet 14 therefrom. A ball-shaped valve member 15 having a passageway 16 therethrough is rotatable within the chamber 12 between positions aligning its passageway with the inlet and outlet to open the flowway, as shown in FIG. 1, and disposing a solid portion thereof across the inlet and outlet to close the flowway.

The valve body 11 comprises a lower portion 17 having flanges 18 at each end for connection in a line and an opening 19 from the top side of the chamber 12. This latter opening is closed by a bonnet 20 releasably connected to the lower body portion 17 by means of bolts 21 or the like. A stem 22 on the valve member 15 extends through packing 23 carried by the bonnet 20, and has an actuating part 24 on its outer end to enable the valve member to be rotated between opened and closed positions. The valve member is located in its alternate positions by any conventional means arranged on the stem and bonnet of the valve body, such as wings 25 on the stem engageable with stops 26 on the upper side of the bonnet. The valve member has a pintle 27 on its lower end received within a recess 28 in the valve body.

The inlet and outlet of the valve body are provided with counterbored portions 29 each to receive an annular seat 30 axially slidable within such portion for engagement at its inner end with one side of the valve member 15. More particularly, each seat is urged into engagement with the valve member by means of a coil spring 31a disposed between the outer end of each seat and the end of the recessed portion of each of the inlet and outlet. As shown, the inside diameters of the seats form continuations of the passageway 16 and inlet and outlet 13 and 14.

Each seat 30 has an annular recess 31 opening onto its inner end to receive a seat ring 32 constructed in accordance with this invention. As best shown in FIGS. 4 and 5, and as will be described more fully hereinafter, the ring protrudes outwardly from the recess and end of the seat and has a seating surface 33 on its end contoured to fit closely against the spherical outer surface of the ball-shaped valve member 15. Obviously, the ball valve 10 has been shown only for purposes of illustration and the invention is also applicable to other types of valves. Furthermore, although the seat rings 32 are carried within the replaceable seats 30, they may instead be carried in a recess formed in the valve body proper.

In any case, however, the seating surface 33 of the seat ring will become worn as the valve member moves thereover upon repeated operations of the valve. Also, and as previously mentioned, experience has shown that there is a tendency for a plastic seat ring of this type to shear along a plane extending at about 45° to the axis of the seat. Still further, the axial thrust of the valve member against the end of the seat ring will naturally have a tendency to collapse the protruding and unsupported portion thereof.

As shown in FIG. 2, each seat ring 32 is preferably formed by the wrapping of alternate layers 34 and 35 of polytetrafluoroethylene and woven cloth, respectively, about a mandrel 37. As shown in FIG. 3, this spiral wrapping of the plastic and reinforcement will form in effect spaced-apart layers of the cloth 35 disposed parallel to the axis of the seat and thus at least substantially perpendicularly to the exposed end of the seat ring. Thus, when the ring is received in the annular recess 31 surrounding the flowway through the valve, the valve member will seat against the cut ends of the cloth. As previously noted, this accomplishes many of the objects of the present invention, without at the same time materially increasing the coefficient of friction of the ring over the coefficient it would have without reinforcement of any type.

As is apparent from the drawings, the flexible sheets of plastic and the woven cloth may be wound tightly about the mandrel 37 to provide any desired number of alternate layers of each. This may be accomplished by rotating the mandrel as the plastic and reinforcement are drawn under tension from suitable rolls. When the desired number of layers have been wrapped about it, the mandrel 37 may be expanded by suitable means to further apply tensile stress to the ring.

As also noted heretofore, the cloth, which is at least partly fiberglass, is preferably coated with polytetrafluoroethylene prior to being wrapped about the mandrel. Then, after the desired number of layers have been wrapped about the mandrel, and preferably while the mandrel is expended to impart further stress to the ring, the wrap-up is molded into a composite ring upon the application of heat. In seat rings manufactured in accordance with the foregoing method, both the sheets of polytetrafluoroethylene and woven cloth have been approximately 0.003 inch thick. Thus, in a seat ring having a thickness of 3/16 inch, there will be approximately thirty-two layers of the plastic and reinforcement.

The woven cloth may be of a mesh which has sixty ends or longitudinal strands per inch and forty-seven picks or lateral strands per inch. In accordance with a further preferred embodiment of the invention, these ends or longitudinal strands are formed of polytetrafluoroethylene, while the lateral strands are formed of fiberglass. Thus, the plastic as well as the reinforcement will expand and contract at least substantially an equal amount in a circumferential sense. As previously noted, this lessens the tendency of the ring to wrinkle, as is the case with rings containing woven cloth made entirely of fiberglass.

When the seat ring has been formed into a cylindrical shape in the manner described, it is removed from the mandrel and pressed into the recess 31 in the seat 30 which has an inner wall 38 formed by a flange 39 on the inner diameter of the seat. As shown in FIG. 3, this flange is initially uncrimped to permit the seat ring 32 to be freely moved into place within the recess 31. However, with the seat ring so received, the flange 39 is crimped radially outwardly to deform the seat ring 32 and thereby secure it in place within the recess, as shown in FIG. 4. More particularly, the inner wall 38 on the flange 39 is curved at 40 convexly with respect to the ring so as to distribute stress at the area of crimping.

As shown in FIG. 4, the ends of the layers of reinforcement will be disposed at least substantially perpendicularly to the spherical surface of the valve member 15, even though the latter is not perpendicular to the axis of the seat. However, as can be seen from FIG. 5, these layers are disposed even more nearly perpendicular to the valve surface by a portion 41 on the outer wall 42 of the recess 31 which is curved concavely with respect to the ring.

As will be appreciated, the recess 31, and particularly one having the configuration shown in FIG. 5, is more easily formed in a replaceable seat 30 than it would be within a valve body such as shown at 11 in FIG. 1. This, of course, is one reason for preferring to carry the seat ring in the replaceable seats, over and above the inherent advantages of such seats over seating surfaces formed in the valve body proper.

The finishing or contouring of the seating surface 33 of the seat ring is best performed after the seat ring has been secured within the recess 31. Obviously, however, the seat may be manufactured in accordance with other methods, particularly wherein the seating surface would be preformed thereon.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

The invention having been described, what is claimed is:

1. A rotary plug valve, comprising a body having a flowway therethrough and a plug member rotatable therein between flowway opening and closing positions, means including a flange providing an annular recess in the body in surrounding relation to the flowway, said recess having inner and outer spaced-apart walls one of which is on the flange, and a plastic seat ring within the recess for engagement with the valve member, said ring having radially spaced-apart layers of reinforcing material molded within the plastic thereof, and said flange being crimped into the ring throughout at least a portion of its circumference to deform it radially and thereby secure it in place and having the recess wall thereof lying against the crimped area of the ring curved convexly with respect to the ring so as to turn the ends of the layers of reinforcing material toward the plug and distribute stress in the crimped area of the ring.

2. A rotary plug valve of the character defined in claim 1, wherein said plastic of the ring is polytetrafluoroethylene and said reinforcing material comprises cloth having woven strands of polytetrafluoroethylene and fiber-glass, with the polytetrafluoroethylene strands extending circumferentially of the ring and the fiberglass strands extending laterally thereacross.

3. A valve seat, comprising an annular body having an annular recess opening onto one end thereof, said recess having inner and outer spaced-apart walls with said inner wall forming a flange radially inwardly of the recess, and a ring of plastic material received within the recess and having a surface protruding from one end of the body to seat a valve member, said ring having radially spaced-apart layers of reinforcing material molded within the plastic material thereof, the outer end of the flange being crimped into the ring throughout its circumference to deform it radially outwardly and thereby retain it within the recess, and the inner flange forming wall of the recess being curved convexly with respect to the ring so as to turn the ends of said layers of reinforcing material radially inwardly toward the valve member to be seated and to distribute stress in the crimped area of the ring.

4. A valve seat of the character defined in claim 3, wherein said plastic of the ring is polytetrafluoroethylene and said reinforcing material comprises cloth having woven strands of polytetrafluoroethylene and fiberglass, with the polytetrafluoroethylene strands extending circumferentially of the ring and the fiberglass strands extending laterally thereacross.

5. A valve, comprising a body having a flowway therethrough, a ball-shaped valve member rotatably mounted within the body to open and close the flowway, means forming an annular recess in the body having spaced-apart inner and outer walls, and a plastic seat ring received within the recess in the body in surrounding relation to the flowway and providing a seating surface at one end for engaging one side of the valve member, said ring being at least substantially cylindrical and having radially spaced-apart layers of reinforcing material within the plastic thereof, and the inner and outer walls of the recess being shaped so as to bend the portion of the ring toward its seating surface inwardly toward the valve member so as to dispose the ends of said layers of reinforcing material at the one end of the ring at least substantially perpendicular to said seating surface.

6. A valve of the character defined in claim 5, wherein said plastic of the ring is polytetrafluoroethylene and said reinforcing material comprises cloth having woven strands of polytetrafluoroethylene and fiberglass, with the polytetrafluoroethylene strands extending circumferentially of the ring and the fiberglass strands extending laterally thereacross.

7. A valve seat, comprising an annular body having an annular recess in one end thereof, said recess having inner and outer spaced-apart walls, and a ring of reinforced polytetrafluoroethylene secured within the recess and protruding from one end of the body to provide a seating surface for engagement with a spherically shaped valve member, said ring being at least substantially cylindrical and the reinforcement within said ring comprising radially spaced-apart layers of cloth, the outer wall of the recess being curved concavely with respect to the ring with the ring bent outwardly into conformity with said outer wall when secured within the recess to thereby force the outer ends of the layers radially inwardly and dispose them at least substantially perpendicularly to said seating surface.

8. A valve seat of the character defined in claim 7, wherein the seat ring is secured by a portion of the seat body on the inner side of the ring which is crimped outwardly against the seat to radially deform it and thereby secure it in place, the inner wall of the recess formed by said portion and against the crimped area of the seat ring being curved convexly with respect to the ring so as to distribute stress in the crimped area thereof.

9. A valve seat of the character defined in claim 7, wherein said cloth has woven strands of polytetrafluoroethylene and fiberglass, with the polytetrafluoroethylene strands extending circumferentially of the ring and the fiberglass strands extending laterally thereacross.

References Cited in the file of this patent

UNITED STATES PATENTS

| Re. 23,102 | Ohls | Dec. 13, 1955 |
| 2,121,464 | Zagorski | June 21, 1937 |
| 2,665,879 | Housekeeper | Jan. 12, 1954 |
| 2,861,773 | Clade | Nov. 25, 1958 |
| 2,925,994 | Downs | Feb. 23, 1960 |
| 2,963,260 | Siravo | Dec. 6, 1960 |

FOREIGN PATENTS

| 622,149 | Great Britain | Apr. 27, 1949 |
| 1,192,348 | France | Apr. 20, 1959 |